(12) United States Patent
Angell et al.

(10) Patent No.: US 7,873,586 B2
(45) Date of Patent: Jan. 18, 2011

(54) RISK ASSESSMENT IN A GATE AREA OF AN AIRPORT

(75) Inventors: Robert Lee Angell, Salt Lake City, UT (US); Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/970,824

(22) Filed: Jan. 8, 2008

(65) Prior Publication Data
US 2009/0177608 A1 Jul. 9, 2009

(51) Int. Cl.
*G06N 5/00* (2006.01)
(52) U.S. Cl. .................................................. 706/45
(58) Field of Classification Search .................... 706/45
See application file for complete search history.

(56) References Cited

PUBLICATIONS

Ware et al ("A Risk-Based Decision Support System for Antiterrorism" Aug. 2002).*

Wheeler et al ("A Scalable Inferencing System for Civilian Terrorism Intelligence" Sep. 2003).*

* cited by examiner

*Primary Examiner*—Michael B. Holmes
*Assistant Examiner*—Lut Wong
(74) *Attorney, Agent, or Firm*—Schmeiser, Olsen & Watts; John R. Pivnichny (57) ABSTRACT

A risk assessment method and system. The method includes receiving by an inference engine, first sensor cohort data associated with a first cohort located within a gate area of an airport. The inference engine receives first group technology inferences associated with the first cohort. The inference engine generates first risk cohort inferences based on the first group technology inferences and the first sensor cohort data. The inference engine receives first inference data comprising a first plurality of inferences associated with the first cohort. The inference engine generates second inference data comprising a second plurality of inferences associated with the first cohort. The second inference data is based on the first inference data and the first risk cohort inferences. The inference engine generates a first associated risk level score for the first cohort. The computing system stores the second inference data and the first associated risk level score.

24 Claims, 6 Drawing Sheets

RISK ASSESSMENT IN A GATE AREA OF AN AIRPORT

FIELD OF THE INVENTION

The present invention relates to a method and associated system for performing a risk assessment process associated with cohorts located in a gate area of an airport.

BACKGROUND OF THE INVENTION

Determining individuals capable of performing activities that may pose a risk to specified objects and locations typically comprises an inaccurate process with little flexibility. Accordingly, there exists a need in the art to overcome at least some of the deficiencies and limitations described herein above.

SUMMARY OF THE INVENTION

The present invention provides a risk assessment method comprising:

receiving, by an inference engine within a computing system, first sensor cohort data associated with a first cohort, said first cohort located within a gate area within an airport;

receiving, by said inference engine, first group technology inferences associated with said first cohort;

generating, by said inference engine, first risk cohort inferences, said generating said first risk cohort inferences based on said first group technology inferences and said first sensor cohort data;

receiving, by said inference engine, first inference data generated by said inference engine, said first inference data comprising a first plurality of inferences associated with said first cohort and a security perimeter area surrounding said airport;

receiving, by said inference engine, second inference data generated by said inference engine, said second inference data comprising a second of plurality of inferences associated with said first cohort and a pre/post security area within said airport;

receiving, by said inference engine, third inference data generated by said inference engine, said third inference data comprising a third of plurality of inferences associated with said first cohort and said gate area within said airport;

generating, by said inference engine, fourth inference data, said fourth inference data comprising a fourth plurality of inferences associated with said first cohort and said gate area within said airport, wherein said generating said fourth inference data is based on said first risk cohort inferences, said first inference data, said second inference data, and said third inference data;

generating, by said inference engine based on said fourth inference data, a first associated risk level score for said first cohort; and storing, by said computing system, said fourth inference data and said first associated risk level score.

The present invention provides a computing system comprising a processor coupled to a computer-readable memory unit, said memory unit comprising instructions that when executed by the processor implement a risk assessment method, said method comprising:

receiving, by an inference engine within said computing system, first sensor cohort data associated with a first cohort, said first cohort located within a gate area within an airport;

receiving, by said inference engine, first group technology inferences associated with said first cohort;

generating, by said inference engine, first risk cohort inferences, said generating said first risk cohort inferences based on said first group technology inferences and said first sensor cohort data;

receiving, by said inference engine, first inference data generated by said inference engine, said first inference data comprising a first plurality of inferences associated with said first cohort and a security perimeter area surrounding said airport;

receiving, by said inference engine, second inference data generated by said inference engine, said second inference data comprising a second of plurality of inferences associated with said first cohort and a pre/post security area within said airport;

receiving, by said inference engine, third inference data generated by said inference engine, said third inference data comprising a third of plurality of inferences associated with said first cohort and said gate area within said airport;

generating, by said inference engine, fourth inference data, said fourth inference data comprising a fourth plurality of inferences associated with said first cohort and said gate area within said airport, wherein said generating said fourth inference data is based on said first risk cohort inferences, said first inference data, said second inference data, and said third inference data;

generating, by said inference engine based on said fourth inference data, a first associated risk level score for said first cohort; and storing, by said computing system, said fourth inference data and said first associated risk level score.

The present invention advantageously provides a simple method and associated system capable of determining individuals capable of performing activities that may pose a risk to specified objects and locations.

DETAILED DESCRIPTION OF THE INVENTION

Figure 1:
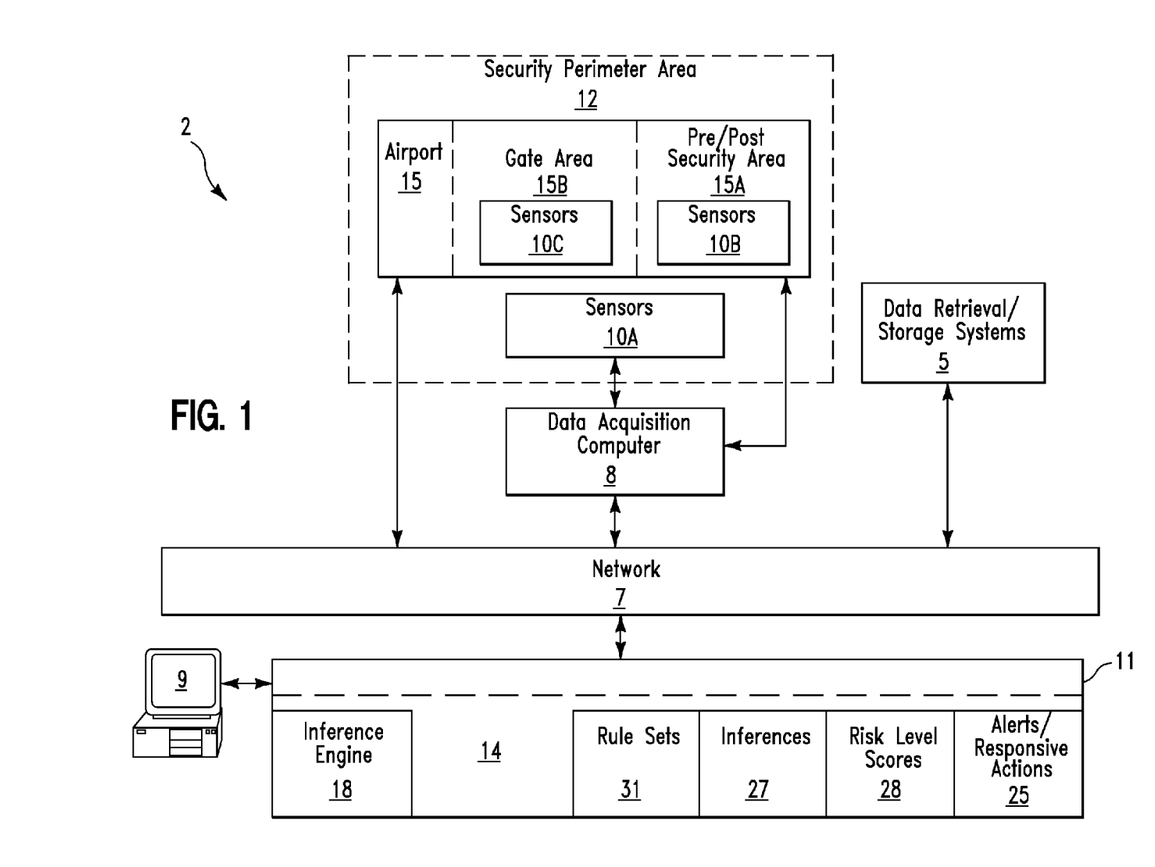
FIG. 1 illustrates a system for performing a risk assessment process associated with air travel, in accordance with embodiments of the present invention.

FIG. 1 illustrates a system 2 for performing a risk assessment process associated with air travel, in accordance with embodiments of the present invention. The risk assessment process is performed with respect to a plurality of cohorts located in an area governed by an airport(s). A cohort is defined herein as a group (or set) of things or people sharing (or potentially sharing) one or more characteristics. Characteristics may comprise, inter alia, physical characteristics, presence or absence of a condition(s), ages, geographical location, etc. A cohort may comprise any size group or set. For example, a cohort may comprise a null set, an infinite set, or anything in between. Cohorts may be generated by computing system 11 using the following categorizations:

1. Known Individuals:
   A. In close proximity to each other at a same time.
   B. Heading to a same aircraft.
   C. Traveling to a same destination.
   D. Changing planes at a same way point in temporal proximity.
2. Behavior Patterns:
   A. Groups of nervous people.
   B. Groups of people devoid of natural movement (e.g., controlled breathing, flat effect, no emotion, etc).
   C. Groups of natural clusters of people that avoid each other.
3. Sensor Patterns:
   A. Traffic analysis.
   B. Cluster of higher than normal signatures (e.g., nitrates).
   C. Clusters of complementary chemical signatures.

The risk assessment process is performed to determine if any person or group of people pose a possible risk to perform nefarious activities (intentional or unintentional) associated with air travel (e.g., pose a possible hijacking threat for an aircraft). System 2 is used to perform the following steps:

1. Continuously retrieve data simultaneously from multiple sources (e.g., from multiple sensors, databases, etc). The data is associated with cohorts that pose a possible threat risk associated with air travel.
2. Analyze the data using statistical and inference processing (i.e., using rule sets 23).
3. Generate an output (e.g., risk assessment scores for the cohorts, alerts associated with the cohorts, etc) based on the analysis of the data.
4. Generate responsive actions (i.e., based on the output from step 3) to be taken to avoid a possible risk associated with air travel.
5. Transmit the output from step 3 and the responsive actions from step 4 to the proper authorities.

System 2 of FIG. 1 comprises sensors 10A, 10B, and 10C and data retrieval/storage systems 5 connected to a computing system 11 through a network 7. Sensors 10A, 10B, and 10C are connected to network 7 through a data acquisition computer 8. Network 7 may comprise any type of network including, inter alia, a local area network, (LAN), a wide area network (WAN), the Internet, etc. Computing system 11 may comprise any type of computing system(s) including, inter alia, a personal computer (PC), a server computer, a database computer, etc. Computing system 11 may comprise, inter alia, a services oriented architecture system, an independent Web 2.0 application/mashup system, etc. Computing system 11 comprises a memory system 14 (e.g., a database). Memory system 14 comprises an inference engine 18 (e.g., a software application), rule sets 31, inferences 27, risk level scores 28, and alerts/responsive actions 25. Rule sets 31 are defined herein as pluggable sets of logic used to handle data and generate inferences 27 and risk level scores 28. System 2 may comprise an optional access terminal 9 connected to computing system 11. Optional access terminal 9 may be used to access inference engine 18 (e.g., for maintenance) or rule sets 31, inferences 27, risk level scores 28, and alerts/responsive actions 25. Inference engine 18 controls all functions related to:

1. Retrieving sensor cohort data from sensors 10A, 10B, and 10C (i.e., via data acquisition computer), and additional data from data retrieval/storage systems 5.
2. Generating inferences based on the sensor cohort data and the additional data.
3. Generating risk level scores 28 for cohorts based on the inferences.
4. Generating alerts/responsive actions 25.
5. Transmitting risk level scores 28 and alerts/responsive actions 25 to the proper authorities. Proper authorities may include, inter alia, police, military personnel, air traffic controller, aircraft pilots, airport personnel, etc.

Inference engine 18 performs the following process with respect to cohorts located in a gate area 15B within an airport 15:

1. Audio, video, biometrical, olfactory, and sensory/actuator based cohorts are used as input into inference engine 18.
2. Inference engine 18 may additionally receive group technology data. Group technology data is defined herein as inferences generated based on characteristics associated with a group of people. For example, if a group of people comprises 3 children, a mom, and a dad, the group technology data may comprise inferences that this group is a family.
3. Inference engine 18 receives inferences associated with a cohort(s) in various locations.
4. Inference engine 18 generates inferences based on all cohorts and data inputted.
5. Inference engine 18 computes associated risk level scores for a cohort based on all generated inferences. These inferences and scores are used to build an iterative portfolio of activities of interest and use this to compare to observed cohort behavior within a system or group of systems.
6. Inference engine 18 generating alerts/responsive actions associated with cohorts and associated risk level scores.
7. The process is recursive.

Sensors 10A are located in a security perimeter area 12 surrounding an airport 15. Security perimeter area 12 is defined herein as a geographical area that surrounds airport 15. Security perimeter area 12 extends about 2 miles in any direction (i.e., at ground level, in the air, underground, etc) around airport 12. Sensors 10A may be located anywhere within security perimeter area 12. Sensors 10A may include any type of sensors including, inter alia, audio sensors, video sensors, multi spectrum sensors (IR, UV, etc), chemical sensors, physical sensors (e.g., weight detection), intercept sensors (phone intercept devices, text message intercept devices, Internet intercept devices, etc), etc. Sensors 10B are located in pre/post security area 15B within airport 15. Pre/post security area 15B is defined herein as an area that comprises all locations within airport 15 except for a gate area (i.e., gate areas include: gates that are used to exit airport 15 for boarding airplanes and waiting area locations for the gate areas). Pre/post security area 15B may include the following areas in airport 15:

1. Ticket counters for purchasing airline tickets.
2. Luggage retrieval areas.
3. Car rental counters (i.e., for renting automobiles)
4. Restrooms.
5. Restaurants and retail stores.
6. Security check point locations (e.g., metal detection areas, etc).

Sensors 10B may be located anywhere within pre/post security area 15A. Sensors 10B may include any type of sensors including, inter alia, audio sensors, video sensors, multi spectrum sensors (IR, UV, etc), chemical sensors, physical sensors (e.g., weight detection), intercept sensors (phone intercept devices, text message intercept devices, Internet intercept devices, etc), etc.

Sensors 10C are located in gate area 15B within airport 15. Gate area 15C is defined herein as an area that comprises locations within airport 15 (or within airport 15 jurisdiction) that are external to pre/post security area 15A. Gate area 15B may include, inter alia, gates (e.g., doors or passageways) that are used to exit airport 15 for boarding airplanes, locations between gates and an aircraft (e.g., a walkway connecting a gate to an aircraft), waiting area locations for the gate areas, locations existing between food service providers for an aircraft and the aircraft, locations existing between luggage areas for placing luggage on or retrieving luggage from an aircraft and the aircraft. Sensors 10C may be located anywhere within gate area 15B. Sensors 10C may include any type of sensors including, inter alia, audio sensors, video sensors, multi spectrum sensors (IR, UV, etc), chemical sensors, physical sensors (e.g., weight detection), intercept sensors (phone intercept devices, text message intercept devices, Internet intercept devices, etc), etc.

Computing system 11 generates various cohorts (i.e., for inputs to inference engine 18) based on data from sensors 10A, 10B, and 10C. Examples of cohorts that may be generated may include, inter alia:

1. Retina detection cohort (e.g., pupil dilation(s), etc).
2. Furtive glance cohort (e.g., normal looking around vs. rapid bidirectional viewing).
3. Respiration cohort (e.g., respiration monitoring and detection).
4. Perspiration cohort (e.g., detection of any abnormal perspiration that may be occurring). Additionally, a perspiration cohort may comprise detection of a possible contagious person within gate area 15C (e.g., flu, etc).
5. Pallor cohort (e.g., a reduced amount of oxyhemoglobin in skin or mucous membrane, a pale color which may be caused by illness, emotional shock or stress, avoiding excessive exposure to sunlight, anemia, or genetics). A reduced amount of oxyhemoglobin is more evident on the face and palms.
6. Facial recognition cohorts (e.g., visually measuring facial stress, etc).

As a cohort(s) (e.g., comprising a person or people) enters security perimeter area 12 (i.e., from a location external to security perimeter area 12), sensors 10A immediately begin to monitor the cohort(s) (e.g., using video monitors, audio monitors, etc). The cohort(s) is continuously monitored while they are within security perimeter area 12. Sensors 10 generate first monitoring data associated with the cohort(s) and security perimeter area 12. The first monitoring data is retrieved by data acquisition computer 8. Data acquisition computer 8 transmits the first monitoring data to computing system 11.

As the cohort(s) (e.g., comprising a person or people) exits security perimeter area 12 and enters pre/post security area 15A, sensors 10B immediately begin to monitor the cohort(s) (e.g., using video monitors, audio monitors, etc). The cohort(s) is continuously monitored while they are within pre/post security area 15A. Sensors 10B generate second monitoring data associated with the cohort(s) and pre/post security area 15A. The second monitoring data is retrieved by data acquisition computer 8. Data acquisition computer 8 transmits the second monitoring data to computing system 11.

As the cohort(s) (e.g., comprising a person or people) exits pre/post security area 15A and enters gate area 15B, sensors 10C immediately begin to monitor the cohort(s) (e.g., using video monitors, audio monitors, etc). The cohort(s) is continuously monitored while they are within gate area 15B. Sensors 10C generate third monitoring data associated with the cohort(s) and gate area 15B. The third monitoring data is retrieved by data acquisition computer 8. Data acquisition computer 8 transmits the third monitoring data to computing system 11. Additionally, external data from data retrieval/storage systems 5 is transmitted to computing system 11. The external data retrieved from data retrieval/storage systems 5 is associated with the cohort in gate area 15B. The external data retrieved from data retrieval/storage systems 5 may comprise any type of data associated with the cohort including, inter alia, individuals within the cohort that are on a no fly or watch list, ticket purchase information (e.g., payment method, timing of purchase, etc) associated with individuals within the cohort, a travel history of individuals in the cohort, etc. The first, second, and third monitoring data retrieved by data acquisition computer 8 and the external data retrieved from data retrieval/storage systems 5 is fed into inference engine 18. Inference engine 18 performs a massively recursive process in order to generate inferences based on the first, second, and third monitoring data and the external data continuously being fed into inference engine 18 and rule sets 23 in computing system 11. The massively recursive process performed by inference engine 18 is described by U.S. patent application Ser. No. 11/678,959 to Friedlander et al. (filed on Feb. 26, 2007), the disclosure of which is hereby incorporated herein by reference in its entirety. The process performed by inference engine 18 is massively recursive in that every piece of information (e.g., inferences, sensor data, etc) added to inference engine 18 causes the process to be re-executed. An entirely different outcome or result may be generated based on new information inputted. Information may include the fact that a query itself was simply made. Information may also include results of a query (i.e., feedback data) or information may include data from any one of a number of sources. Inference engine 18 generates the inferences using the following analytical process:

1. Record analytical data (i.e., data from sensors 10A, 10B, and 10C and data retrieval/storage systems 5) into inference engine 18.
2. Generate cohorts
3. Generate inferences and risk level scores.
4. Issue additional information queries (i.e., from sensors 10A, 10B, and 10C and data retrieval/storage systems 5) based anomalous cohort behaviors.
5. Modify cohorts based on anomalous behavior.
6. Receive additional information.
7. Generate new inferences and risk level scores based anomalous behaviors.
8. Continue cycling through process.

Several actions may be taken by computing system 11 based on the inferences generated by inference engine 18. The following list comprises examples of actions that may be taken by computing system 11:

1. Generate informational alerts associated with a specified aircraft.
2. Generate warning alerts associated with a specified aircraft.
3. Generate actions to disrupt a potential situation. For example, seating plans on an aircraft may be modified, an aircraft may be delayed, a security force may be dispatched, etc.

Figure 2:
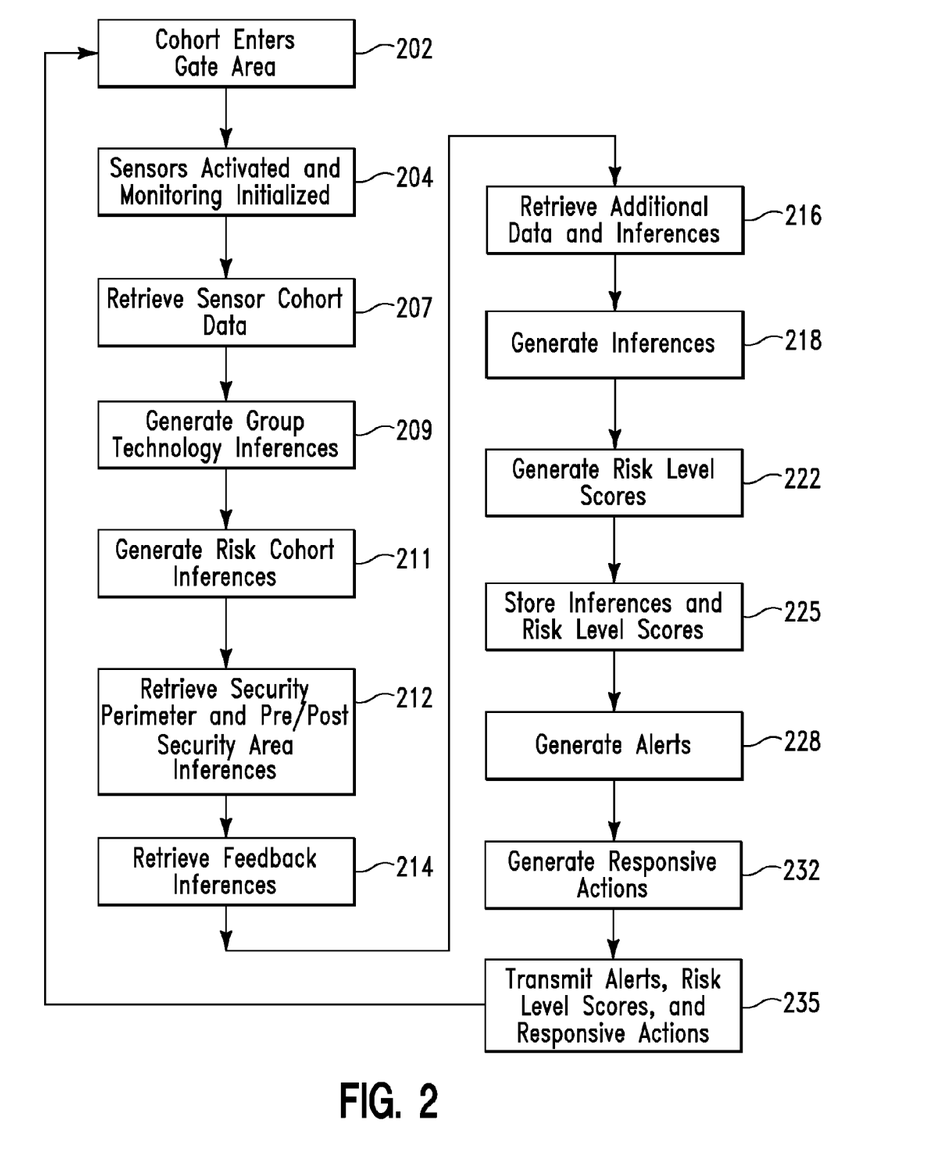
FIG. 2 illustrates a flowchart describing an algorithm used by the system of FIG. 1 for performing a risk assessment process associated with air travel, in accordance with embodiments of the present invention.

FIG. 2 illustrates a flowchart describing an algorithm used by system 2 of FIG. 1 for performing a risk assessment process associated with air travel, in accordance with embodiments of the present invention. In step 202, a cohort (e.g., comprising a person(s)) enters gate area 15B (i.e., from a location external to gate area 15B such as, inter alia, pre/post security area 15A). In step 204, sensors 10C are activated and monitoring is initialized. The cohort is continuously monitored while located within gate area 15B. In step 207, data from sensors 10C is transmitted (i.e., via data acquisition computer 8) to computing system 11 and sensor cohorts are generated. In step 209, group technology inferences associated with the cohort are generated (i.e., using sensor cohort data and inference engine 18). In step 211, inference engine 18 generates risk cohort inferences based on the sensor (i.e., from sensors 10C) cohort data and the group technology inferences. In step 212, previously generated inferences associated with the cohort(s) located within security perimeter area 12, and pre/post security area 15A are retrieved from inferences 27 in memory system 14. In step 214, feedback inferences associated with the cohort and gate area 15B (i.e., previously generated inferences) are retrieved from inferences 27 to be used as input into inference engine 18. In step 216, any additional data (e.g., individuals within the cohort that are on a no fly or watch list, ticket purchase information (e.g., payment method, timing of purchase, etc) associated with individuals within the cohort, a travel history of individuals in the cohort, etc) and/or additional inferences (e.g., generated by additional systems) are retrieved from data retrieval/storage systems 5. In step 218, inference engine generates new inferences based on all data and inferences generated and/or retrieved in steps 207, 209, 211, 212, 214, and 216. In step 222, risk level scores for the cohort are generated based on the new inferences. In step 225, the new inferences and risk level scores are stored in memory system 14. In step 228, alerts are generated based on the risk level scores. For example, if any of the risk level scores exceed a predetermined threshold, an alert may be generated. In step 232, responsive actions based on the alerts are generated. For example, responsive actions may comprise, inter alia, modifying seating plans on an aircraft, delaying an aircraft, dispatching a security force, etc. In step 235, the risk level scores, alerts, and responsive actions are transmitted to the proper authorities. Proper authorities may include, inter alia, police, military personnel, air traffic controller, aircraft pilots, airport personnel, etc. The massively recursive process described in the algorithm of FIG. 2 is continuously repeated. Note that all steps in FIG. 2 may be performed simultaneously.

Figure 3:
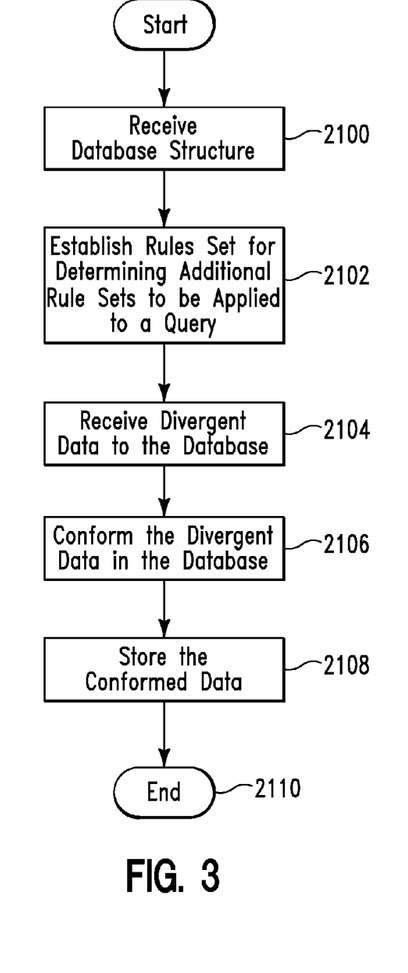
FIG. 3 illustrates a flowchart describing an algorithm used by the system of FIG. 1 for establishing a database adapted to establish a probability of an inference based on data contained in the database, in accordance with embodiments of the present invention.

FIG. 3 illustrates a flowchart describing an algorithm used by system 2 of FIG. 1 for establishing a database adapted to establish a probability of an inference based on data contained in the database, in accordance with embodiments of the present invention. The database established in the algorithm of FIG. 3 is used to perform the process illustrated by the algorithm of FIG. 2. In step 2100, the process begins as computing system 11 receives a database structure (i.e., comprising data retrieved in steps 207, 209, 212, 214, and 216 of FIG. 2). In step 2102, computing system 11, establishes a rules set for determining additional rule sets to be applied to a data query. The rules set is established in order to limit a scope of comparison for a very large amount of data. Therefore, computing system 11 establishes a set of determination rules used to determine the search rules used during a query. In step 2104, computing system 11 additionally receives divergent data. Divergent data is defined as sets of data having different types, sizes, compatibilities, and other differences. Divergent data may be received from many different sources. In step 2106, computing system 11 conforms received divergent data to the database (e.g., memory system 14). In step 2108, computing system 11 stores conformed data and the process terminates in step 2110.

Figure 4:
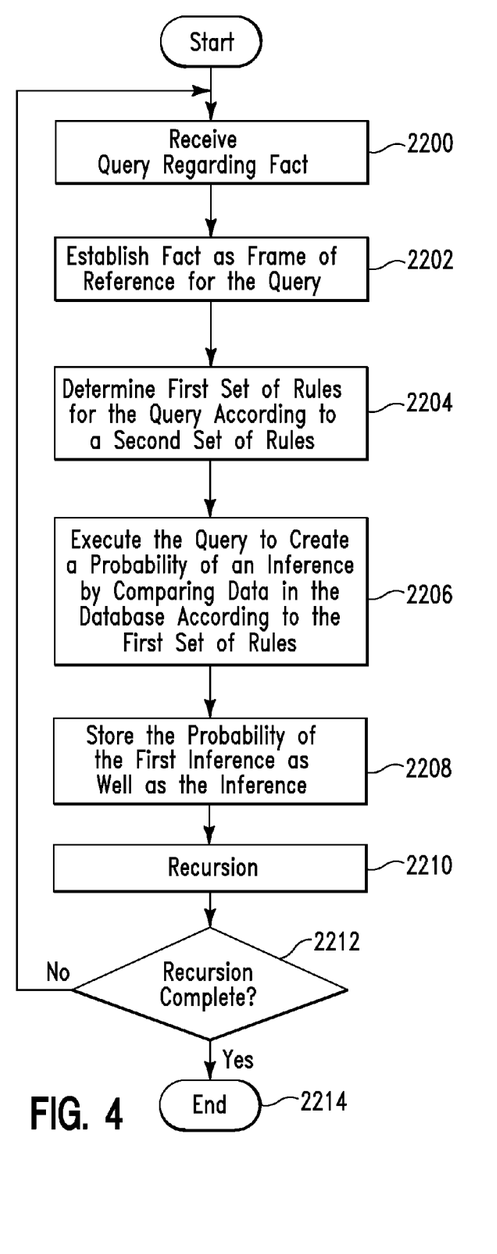
FIG. 4 illustrates a flowchart describing an algorithm used by the system 2 of FIG. 1 for executing of a first query in a database to establish a probability of an inference based on data contained in the database, in accordance with embodiments of the present invention.

FIG. 4 illustrates a flowchart describing an algorithm used by system 2 of FIG. 1 for executing of a query in a database to establish a probability of an inference based on data contained in the database, in accordance with embodiments of the present invention. The query executed in the algorithm of FIG. 3 is used to perform the process illustrated by the algorithm of FIG. 2. In step 2200, computing system 11 receives a query regarding a fact. In step 2202, computing system 11 establishes the fact as a frame of reference for the query. In step 2204, computing system 11 determines a first set of rules for the query according to a second set of rules. In step 2206, computing system 11 executes the query according to the first set of rules to create a probability of an inference by comparing data in the database (e.g., memory system 14). In step 2208, computing system 11 stores the probability of the first inference and additionally stores the first inference. In step 2210, computing system 11 performs a recursion process. During the recursion process steps 2200 through 2208 are repeated again and again, as each new inference and each new probability becomes a new fact that can be used to generate a new probability and a new inference. Additionally, new facts may be received in memory system 14 during this process, and those new facts also influence the resulting process. Each conclusion or inference generated during the recursion process may be presented to a user. As a first alternative, only a final conclusion or inference may be presented to a user. As a second alternative, a number of conclusions made prior to step 2210 may be presented to a user.

In step 2212, computing system 11 determines whether the recursion process is complete. If in step 2212, computing system 11 determines that recursion is not complete, then the process illustrated in steps 2200-2210 continues. If in step 2212, computing system 11 determines that recursion is complete then the process terminates in step 2214.

Figures 5, 5A:
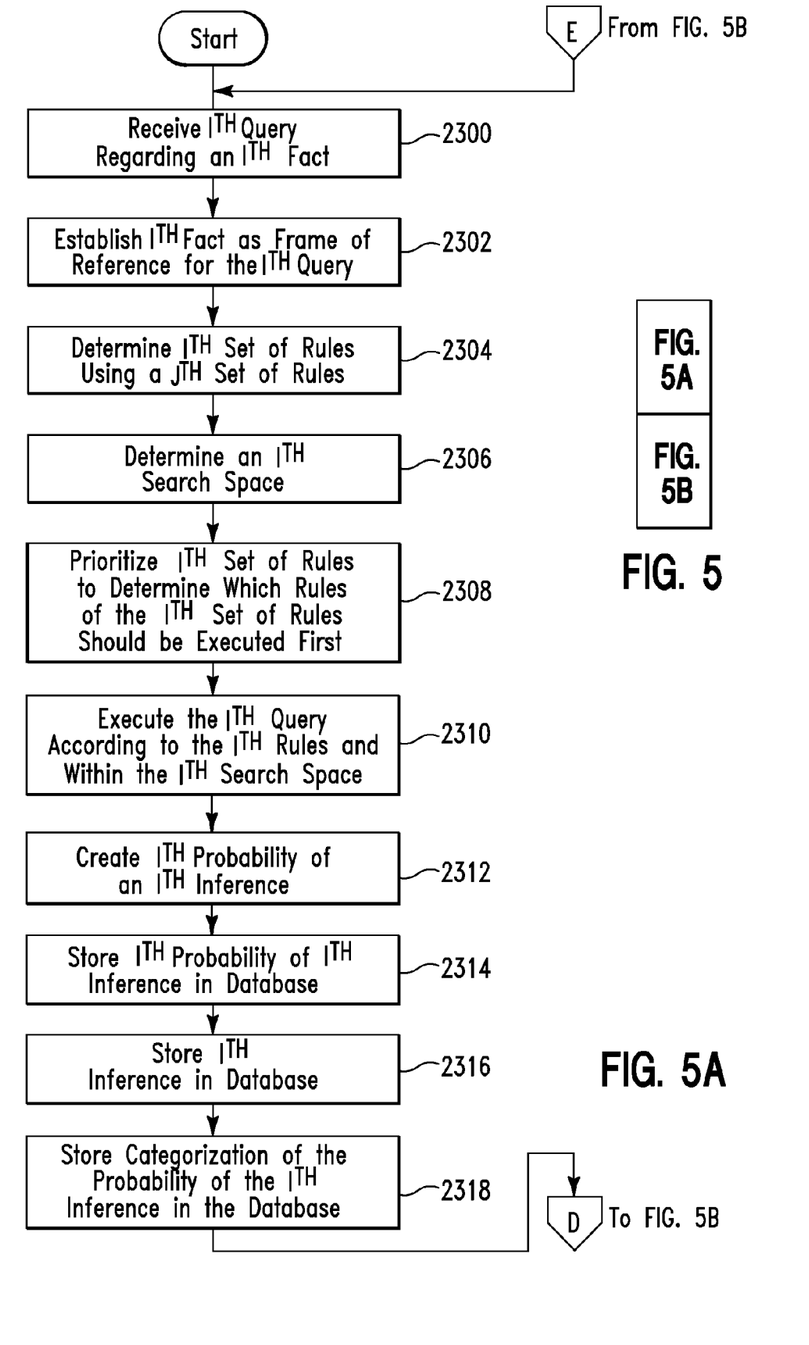
FIGS. 5A and 5B illustrate a flowchart describing an algorithm used by the system of FIG. 1 for executing a second query in a database to establish a probability of an inference based on data contained in the database, in accordance with embodiments of the present invention.
Figure 5B:
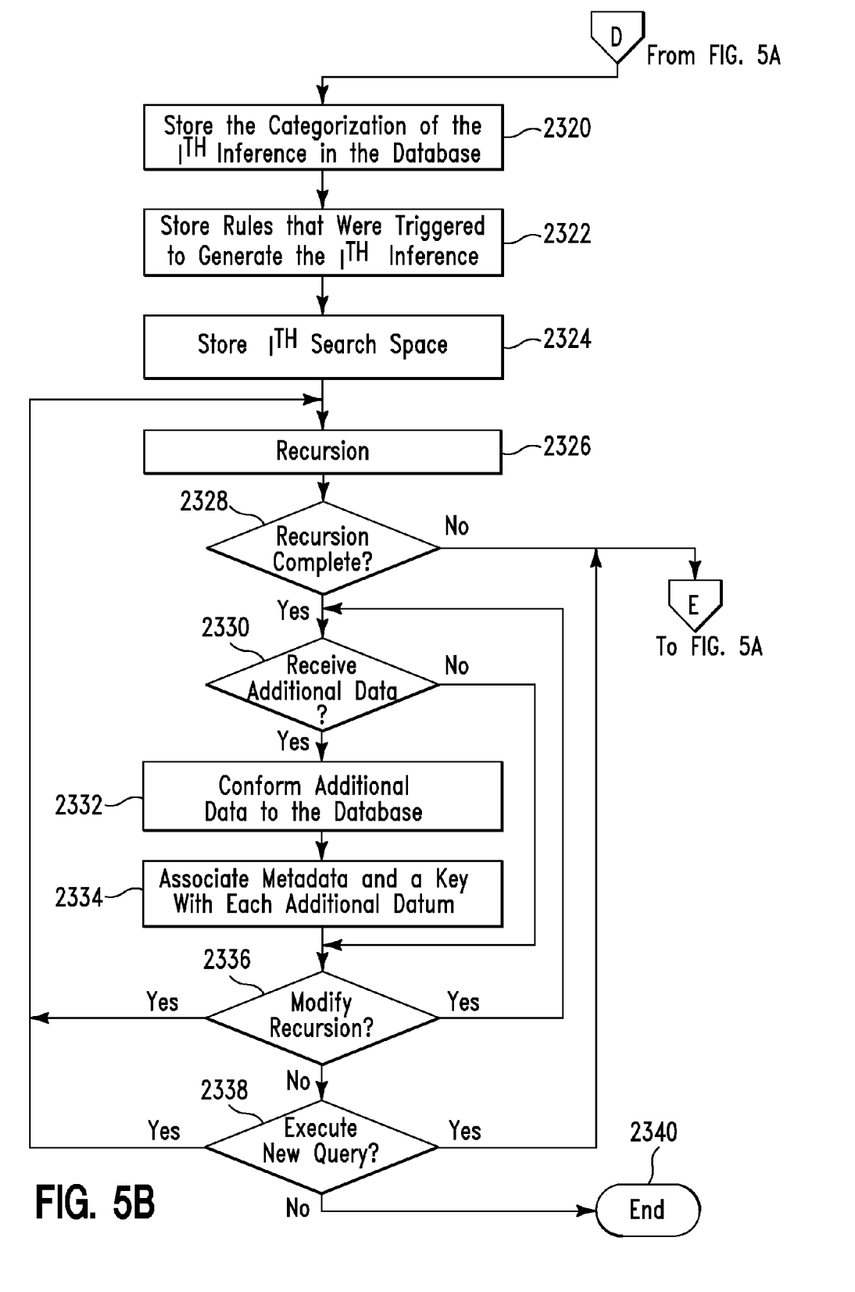

FIGS. 5A and 5B illustrate a flowchart describing an algorithm used by system 2 of FIG. 1 for executing a query in a database to establish a probability of an inference based on data contained in the database, in accordance with embodiments of the present invention. The query executed in the algorithm of FIGS. 5A and 5B is used to perform the process illustrated by the algorithm of FIG. 2. In step 2300, computing system 11 receives an $I^{th}$ query regarding an $I^{th}$ fact. The term "$I^{th}$" refers to an integer, beginning with one. The integer reflects how many times a recursion process, referred to below, has been conducted. Thus, for example, when a query is first submitted that query is the $1^{st}$ query. The first recursion is the $2^{nd}$ query. The second recursion is the $3^{rd}$ query, and so forth until recursion I-1 forms the "$I^{th}$" query. Similarly, but not the same, the $I^{th}$ fact is the fact associated with the $I^{th}$ query. Thus, the $1^{st}$ fact is associated with the $1^{st}$ query, the $2^{nd}$ fact is associated with the $2^{nd}$ query, etc. The $I^{th}$ fact can be the same as previous facts, such as the $I^{th}$-1 fact, the $I^{th}$-2 fact, etc. The $I^{th}$ fact can be a compound fact. A compound fact is a fact that includes multiple sub-facts. The $I^{th}$ fact can start as a single fact and become a compound fact on subsequent recursions or iterations. The $I^{th}$ fact is likely to become a compound fact during recursion, as additional information is added to the central database during each recursion. In step 2302, (i.e., after receiving the $I^{th}$ query), computing system 11 establishes the $I^{th}$ fact as a frame of reference for the $I^{th}$ query. A frame of reference is an anchor datum or set of data that is used to limit which data are searched in the database/memory system 14 (i.e., defines a search space). The frame of reference also is used to determine to what rules the searched data will be subject to. Therefore, when the query is executed, sufficient processing power will be available to make inferences. In step 2304, computing system 11 determines an $I^{th}$ set of rules using a $J^{th}$ set of rules. In other words, a different set of rules is used to determine the set of rules that are actually applied to the $I^{th}$ query. The term "$J^{th}$" refers to an integer, starting with one, wherein J=1 is the first iteration of the recursion process and I-1 is the $J^{th}$ iteration of the recursion process. The $J^{th}$ set of rules may or may not change from the previous set, such that $J^{th}$-1 set of rules may or may not be the same as the $J^{th}$ set of rules. The term "$J^{th}$" set of rules refers to the set of rules that establishes the search rules, which are the $I^{th}$ set of rules. The $J^{th}$ set of rules is used to determine the $I^{th}$ set of rules. In step 2306, computing system 11 determines an $I^{th}$ search space). The $I^{th}$ search space is the search space for the $I^{th}$ iteration. A search space is the portion of a database (e.g., memory system 14), or a subset of data within a database, that is to be searched. In step 2308, computing system 11 prioritizes the $I^{th}$ set of rules (i.e., determined during step 2304) in order to determine which rules of the $I^{th}$ set of rules should be executed first. Additionally, computing system 11 may prioritize the remaining rules in the $I^{th}$ set of rules. Note that because computing resources are not infinite, those rules that are most likely to produce useful or interesting results are executed first. In step 2310, computing system 11 executes the $I^{th}$ query according to the $I^{th}$ set of rules and within the $I^{th}$ search space). As a result, in step 2312, computing system 11 creates an $I^{th}$ probability of an $I^{th}$ inference. An inference is a conclusion based on a comparison of facts within the database (e.g., memory system 14). The probability of the inference is the likelihood that the inference is true, or alternatively the probability that the inference is false. The $I^{th}$ probability and the $I^{th}$ inference need not be the same as the previous inference and probability in the recursion process, or one value could change but not the other. For example, as a result of the recursion process the $I^{th}$ inference might be the same as the previous iteration in the recursion process, but the $I^{th}$ probability could increase or decrease over the previous iteration in the recursion process. In contrast, the $I^{th}$ inference may be completely different than the inference created in the previous iteration of the recursion process with a probability that is either the same or different than the probability generated in the previous iteration of the recursion process. In step 2314, computing system 11 stores the $I^{th}$ probability of the $I^{th}$ inference as an additional datum in the database (e.g., memory system 14). In step 2316, computing system 11 stores the $I^{th}$ inference in the database (e.g., memory system 14). In step 2318, computing system 11 stores a categorization of the probability of the $I^{th}$ inference in the database (e.g., memory system 14). In step 2320, computing system 11 stores the categorization of the $I^{th}$ inference in the database (e.g., memory system 14). In step 2322, computing system 11 stores the rules that were triggered in the $I^{th}$ set of rules to generate the $I^{th}$ inference. In step 2324, computing system 11 stores the $I^{th}$ search space. Additional information generated as a result of executing the query may also be stored at this time. All of the information stored in steps 2314 through 2324, and possibly in additional storage steps for additional information, may change how computing system 11 performs, how computing system 11 behaves, and may change the result during each iteration.

The process then follows two paths simultaneously. First, computing system 11 performs a recursion process in step 2326 in which steps 2300 through 2324 are continuously performed, as described above. Second, computing system 11 determines whether additional data is received in step 2330. Additionally, after each recursion, computing system 11 determines whether the recursion is complete in step 2328.

The process of recursion is complete when a threshold is met. As a first example, a threshold is a probability of an inference. When the probability of an inference decreases below a particular number, the recursion is complete and is made to stop. As a second example, a threshold is a number of recursions. Once the given number of recursions is met, the process of recursion stops. Other thresholds may also be used.

If the process of recursion is not complete, then recursion continues, beginning again with step 2300.

If the process of recursion is complete, then the process returns to step 2330. Therefore, computing system 11 determines whether additional data is received at step 2330 during the recursion process in steps 2300 through 2324 and after the recursion process is completed at step 2328. If additional data is received, then computing system 11 conforms the additional data to the database (e.g., memory system 14) in step 2332. The system also associates metadata and a key with each additional datum (step 2334). A key uniquely identifies an individual datum. A key can be any unique identifier, such as a series of numbers, alphanumeric characters, other characters, or other methods of uniquely identifying objects.

If computing system 11 determines that additional data has not been received at step 2330, or after associating metadata and a key with each additional datum in step 2334, then computing system 11 determines whether to modify the recursion process in step 2336. Modification of the recursion process may include determining new sets of rules, expanding the search space, performing additional recursions after recursions were completed at step 2328, or continuing the recursion process.

In response to a positive determination to modify the recursion process at step 2336, computing system 11 again repeats the determination whether additional data has been received at step 2330 and also performs additional recursions from steps 2300 through 2324, as described with respect to step 2326.

In step 2238, in response to a negative determination to modify the recursion process at step 2336, computing system 11 determines whether to execute a new query. Computing system 11 may decide to execute a new query based on an inference derived at step 2312, or may execute a new query based on a prompt or entry by a user. If computing system 11 executes a new query, then computing system may optionally continue recursion at step 2326, begin a new query recursion process at step 2300, or perform both simultaneously. Therefore, multiple query recursion processes may occur at a same time. However, if no new query is to be executed at step 2338, then the process terminates in step 2340.

Figure 6:
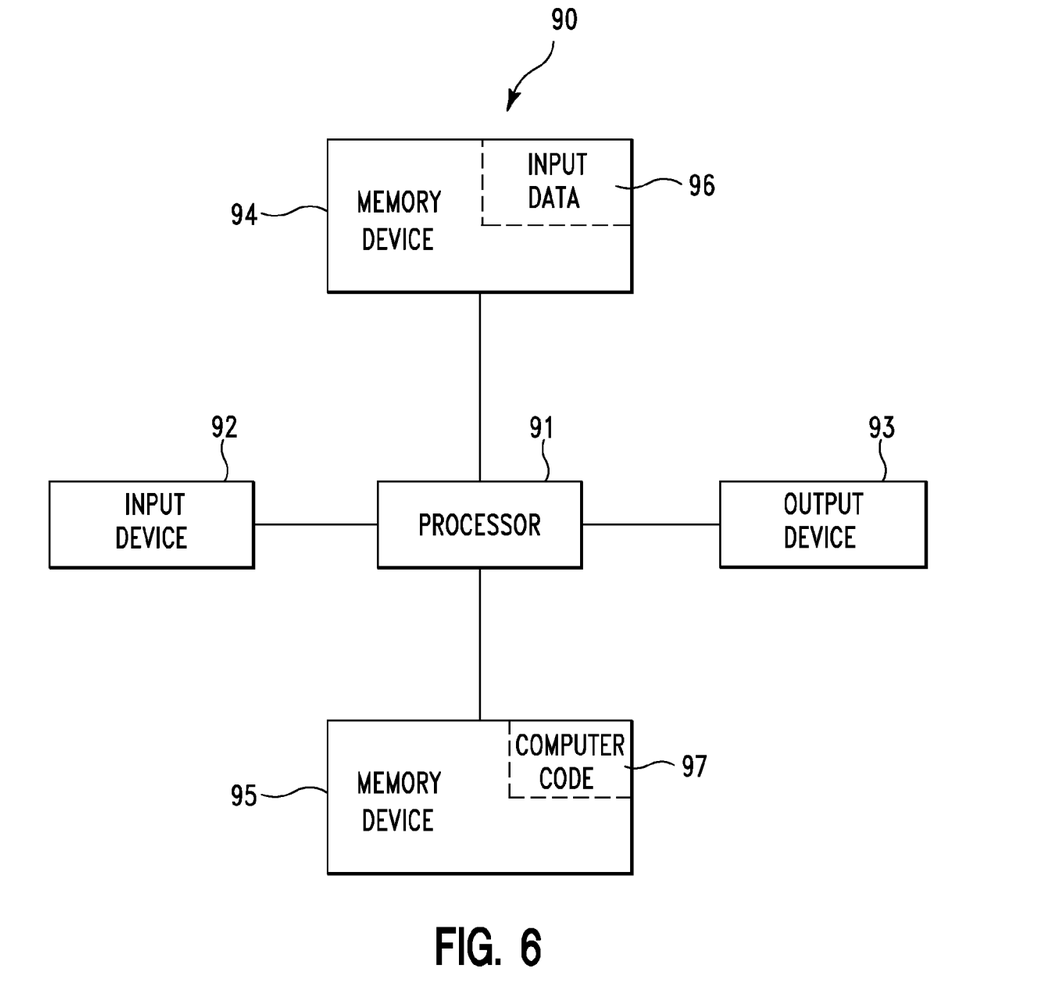
FIG. 6 illustrates a computer apparatus used for performing a risk assessment process associated with air travel, in accordance with embodiments of the present invention.

FIG. 6 illustrates a computer apparatus 90 (e.g., computing system 11 of FIG. 1) used for performing a risk assessment process associated with air travel, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5B) for performing a risk assessment process associated with air travel. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithms of FIGS. 2-5B and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to perform a procurement requisition process. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for performing a risk assessment process associated with air travel. In another embodiment, the invention provides a business method that performs the process steps of the invention on a subscription, advertising, and/or fee basis. That is, a service provider, such as a Solution Integrator, could offer to perform a risk assessment process associated with air travel. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A risk assessment method comprising:
  receiving, by an inference engine within a computing system, first sensor cohort data associated with a first cohort, said first cohort located within a gate area within an airport;
  receiving, by said inference engine, first group technology inferences associated with said first cohort;
  generating, by said inference engine, first risk cohort inferences, said generating said first risk cohort inferences based on said first group technology inferences and said first sensor cohort data;
  receiving, by said inference engine, first inference data generated by said inference engine, said first inference data comprising a first plurality of inferences associated with said first cohort and a security perimeter area surrounding said airport;
  receiving, by said inference engine, second inference data generated by said inference engine, said second inference data comprising a second of plurality of inferences associated with said first cohort and a pre/post security area within said airport;
  receiving, by said inference engine, third inference data generated by said inference engine, said third inference data comprising a third of plurality of inferences associated with said first cohort and said gate area within said airport;
  generating, by said inference engine, fourth inference data, said fourth inference data comprising a fourth plurality of inferences associated with said first cohort and said gate area within said airport, wherein said generating said fourth inference data is based on said first risk cohort inferences, said first inference data, said second inference data, and said third inference data;
  generating, by said inference engine based on said fourth inference data, a first associated risk level score for said first cohort; and
  storing, by said computing system, said fourth inference data and said first associated risk level score.

2. The method of claim 1, further comprising:
  receiving, by said inference engine, second sensor cohort data associated with a second cohort, said second cohort located within said gate area within said airport;
  receiving, by said inference engine, second group technology inferences associated with said second cohort;
  generating, by said inference engine, second risk cohort inferences, said generating said second risk cohort inferences based on said second group technology inferences and said second sensor cohort data;
  receiving, by said inference engine, fifth inference data generated by said inference engine, said fifth inference data comprising a fifth plurality of inferences associated with said second cohort and said security perimeter area surrounding said airport;
  receiving, by said inference engine, sixth inference data generated by said inference engine, said sixth inference data comprising a sixth plurality of inferences associated with said second cohort and said pre/post security area within said airport;
  generating, by said inference engine, seventh inference data, said seventh inference data comprising a seventh plurality of inferences associated with said second cohort, wherein said generating said seventh inference data is based on said second risk cohort inferences, said fifth inference data, and said sixth inference data;
  generating, by said inference engine based on said seventh inference data, a second associated risk level score for said second cohort; and
  storing, by said computing system, said seventh inference data and said second associated risk level score.

3. The method of claim 2, further comprising:
  receiving, by said inference engine, eighth inference data generated by said inference engine, said eighth inference data comprising an eighth plurality of inferences associated with said second cohort and said gate area within said airport, wherein said generating said seventh inference data is further based on said eighth inference data.

4. The method of claim 3, further comprising:
  generating, by said inference engine, ninth inference data, said ninth inference data comprising a ninth plurality of inferences associated with said second cohort, said generating said ninth inference data based on said fourth inference data and said seventh inference data;

generating, by said inference engine based on said ninth inference data, a third associated risk level score for said second cohort; and storing, by said computing system, said ninth inference data and said third associated risk level score.

5. The method of claim 4, further comprising:

receiving, by said inference engine, third sensor cohort data associated with a third cohort, said third cohort located within an area governed by said airport;

receiving, by said inference engine, third group technology inferences associated with said third cohort;

generating, by said inference engine, third risk cohort inferences, said generating said third risk cohort inferences based on said third group technology inferences and said third sensor cohort data;

generating, by said inference engine, tenth inference data, said tenth inference data comprising a tenth plurality of inferences associated with said third cohort, wherein said generating said tenth inference data is based on said third risk cohort inferences and said ninth inference data;

generating, by said inference engine based on said tenth inference data, a fourth associated risk level score for said third cohort; and storing, by said computing system, said tenth inference data and said fourth associated risk level score.

6. The method of claim 1, further comprising:

presenting, by said computing system, said fourth inference data and said first associated risk level score.

7. The method of claim 1, further comprising:

generating, by said computing system, an alert associated with said first associated risk level score for said first cohort; and presenting by said computing system, said alert.

8. The method of claim 1, wherein said first sensor cohort data comprises data selected from the group consisting of audio sensor data, video sensor data, biometrical sensor data, olfactory sensor data, and sensory/actuator data.

9. The method of claim 1, wherein said first sensor cohort data comprises data associated with a cohort selected from the group consisting of a retina detection cohort, a directional viewing cohort, a respiration cohort, a perspiration cohort, a pallor cohort, and a facial recognition cohort.

10. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

11. A computer program product, comprising a computer storage medium comprising a computer readable program code embodied therein, said computer readable program code configured to perform the method of claim 1 upon being executed by a processor of said computing system.

12. The method of claim 1, wherein said computing system comprises a system selected from the group consisting of a services oriented architecture system and an independent Web 2.0 application/mashup system.

13. The method of claim 1, further comprising:

receiving, by said inference engine, additional inference data, said additional inference data comprising an additional plurality of inferences associated with said first cohort;

generating, by said inference engine based on said additional inference data and said fourth inference data, a second associated risk level score for said first cohort; and storing, by said computing system, said second associated risk level score.

14. A computing system comprising a processor coupled to a computer-readable memory unit, said memory unit comprising instructions that when executed by the processor implement a risk assessment method, said method comprising:

receiving, by an inference engine within said computing system, first sensor cohort data associated with a first cohort, said first cohort located within a gate area within an airport;

receiving, by said inference engine, first group technology inferences associated with said first cohort;

generating, by said inference engine, first risk cohort inferences, said generating said first risk cohort inferences based on said first group technology inferences and said first sensor cohort data;

receiving, by said inference engine, first inference data generated by said inference engine, said first inference data comprising a first plurality of inferences associated with said first cohort and a security perimeter area surrounding said airport;

receiving, by said inference engine, second inference data generated by said inference engine, said second inference data comprising a second of plurality of inferences associated with said first cohort and a pre/post security area within said airport;

receiving, by said inference engine, third inference data generated by said inference engine, said third inference data comprising a third of plurality of inferences associated with said first cohort and said gate area within said airport;

generating, by said inference engine, fourth inference data, said fourth inference data comprising a fourth plurality of inferences associated with said first cohort and said gate area within said airport, wherein said generating said fourth inference data is based on said first risk cohort inferences, said first inference data, said second inference data, and said third inference data;

generating, by said inference engine based on said fourth inference data, a first associated risk level score for said first cohort; and storing, by said computing system, said fourth inference data and said first associated risk level score.

15. The computing system of claim 14, wherein said method further comprises:

receiving, by said inference engine, second sensor cohort data associated with a second cohort, said second cohort located within said gate area within said airport;

receiving, by said inference engine, second group technology inferences associated with said second cohort;

generating, by said inference engine, second risk cohort inferences, said generating said second risk cohort inferences based on said second group technology inferences and said second sensor cohort data;

receiving, by said inference engine, fifth inference data generated by said inference engine, said fifth inference data comprising a fifth plurality of inferences associated with said second cohort and said security perimeter area surrounding said airport;

receiving, by said inference engine, sixth inference data generated by said inference engine, said sixth inference data comprising a sixth plurality of inferences associated with said second cohort and said pre/post security area within said airport;

generating, by said inference engine, seventh inference data, said seventh inference data comprising a seventh plurality of inferences associated with said second cohort, wherein said generating said seventh inference data is based on second risk cohort inferences, said fifth inference data, and said sixth inference data;

generating, by said inference engine based on said seventh inference data, a second associated risk level score for said second cohort; and storing, by said computing system, said seventh inference data and said second associated risk level score.

16. The computing system of claim 15, wherein said method further comprises:

receiving, by said inference engine, eighth inference data generated by said inference engine, said eighth inference data comprising an eighth plurality of inferences associated with said second cohort and said gate area within said airport, wherein said generating said seventh inference data is further based on said eighth inference data.

17. The computing system of claim 16, wherein said method further comprises:

generating, by said inference engine, ninth inference data, said ninth inference data comprising a ninth plurality of inferences associated with said second cohort, said generating said ninth inference data based on said fourth inference data and said seventh inference data;

generating, by said inference engine based on said ninth inference data, a third associated risk level score for said second cohort; and storing, by said computing system, said ninth inference data and said third associated risk level score.

18. The computing system of claim 17 wherein said method further comprises:

receiving, by said inference engine, third sensor cohort data associated with a third cohort, said third cohort located within an area governed by said airport;

receiving, by said inference engine, third group technology inferences associated with said third cohort;

generating, by said inference engine, third risk cohort inferences, said generating said third risk cohort inferences based on said third group technology inferences and said third sensor cohort data;

generating, by said inference engine, tenth inference data, said tenth inference data comprising a tenth plurality of inferences associated with said third cohort, wherein said generating said tenth inference data is based on said third risk cohort inferences and said ninth inference data;

generating, by said inference engine based on said tenth inference data, a fourth associated risk level score for said third cohort; and storing, by said computing system, said tenth inference data and said fourth associated risk level score.

19. The computing system of claim 14, wherein said method further comprises:

presenting, by said computing system, said fourth inference data and said first associated risk level.

20. The computing system of claim 14, wherein said method further comprises:

generating, by said computing system, an alert associated with said first associated risk level score for said first cohort; and presenting by said computing system, said alert.

21. The computing system of claim 14, wherein said first sensor cohort data comprises data selected from the group consisting of audio sensor data, video sensor data, biometrical sensor data, olfactory sensor data, and sensory/actuator data.

22. The computing system of claim 14, wherein said first sensor cohort data comprises data associated with a cohort selected from the group consisting of a retina detection cohort, a directional viewing cohort, a respiration cohort, a perspiration cohort, a pallor cohort, and a face cohort.

23. The computing system of claim 14, wherein said computing system comprises a system selected from the group consisting of a services oriented architecture system and an independent Web 2.0 application/mashup system.

24. The computing system of claim 14, wherein said method further comprises:

receiving, by said inference engine, additional inference data, said additional inference data comprising an additional plurality of inferences associated with said first cohort;

generating, by said inference engine based on said additional inference data and said fourth inference data, a second associated risk level score for said first cohort; and storing, by said computing system, said second associated risk level score.

* * * * *